UNITED STATES PATENT OFFICE.

WALTER C. HOLMES, OF WOODBURY, NEW JERSEY, ASSIGNOR TO E. I. DU PONT DE NEMOURS & COMPANY, OF WILMINGTON, DELAWARE, A CORPORATION OF DELAWARE.

PROCESS OF OBTAINING A LIQUID OF HIGH ACIDITY FROM NITER CAKE.

1,354,649. Specification of Letters Patent. Patented Oct. 5, 1920.

No Drawing. Application filed November 27, 1918. Serial No. 264,319.

*To all whom it may concern:*

Be it known that I, WALTER C. HOLMES, of Woodbury, in the county of Gloucester, State of New Jersey, have invented a certain new and useful Improvement in the Processes of Obtaining a Liquid of High Acidity from Niter Cake, and do hereby declare that the following is a full, clear, and exact description thereof.

My invention relates particularly to a process by means of which niter cake may be treated to obtain solutions having a very high acidity.

Previously, solutions obtained from niter cake have had only a comparatively low acidity when applied as a substitute for sulfuric acid, owing to the limited solubility of the niter cake in water, and because the solid niter cake only has sufficient acidity to represent an amount not above 32% of the strength of 100% sulfuric acid.

The object of my invention is to provide a process by means of which solutions obtained from niter cake may be produced on a commercial scale, and in accordance with a commercially practicable method, which solutions have a greater acidity than was hitherto available in the commercial products.

My invention allows an acidity to be obtained that is much higher than has hitherto been possible. I may obtain this higher acidity by use of the counter current principle of treating niter cake, that is by first treating niter cake with water, then successively treating fresh quantities of niter cake with the solution obtained from the previous washing. This systematic treatment of niter cake may be carried out by agitating niter cake with water, then removing the solution from the undissolved solid by filtration, decantation or other means, and repeating this procedure until the desired or maximum acidity is obtained. Or, instead, the niter cake may be arranged in masses or piles and the water may be allowed to pass through the same slowly, as through a filter bed. Or the procedure may be otherwise varied, as for example, by treating only a single very large quantity of niter cake with a single very large quantity of niter cake with a single body of water insufficient to dissolve the same for a long period of time.

While my invention is capable of being carried out in many different ways, for the purpose of illustration I have described only certain ways of carrying out the same herein.

For example, 100 pounds of niter cake, that is to say the commercial by-product obtained in the manufacture of nitric acid, and which is comprised of a mixture of sodium acid sulfate and neutral sodium sulfate, and which may be comprised of particles of any size, but which will preferably be in powdered form, is treated with 40 gallons of water. The niter cake is agitated in the water in any desired manner. Thereafter, the solution is removed by filtration, decantation or otherwise, and this solution is then applied to a fresh quantity of niter cake amounting to 90 pounds and agitated therewith. Thereupon the liquid is again removed in the same manner and applied thereafter in the same manner to additional quantities of fresh niter cake until the desired degree of acidity is obtained. In this manner, a liquid is obtained having an acidity as high as 20 to 30% in strength of 100% sulfuric acid, which is much higher than has been available previously.

The above treatment may be carried out at any desired temperature, and may, for example, be conducted at atmospheric temperatures.

The above process is in effect a treatment of niter cake with a quantity of water on the counter current principle, as it brings into contact a liquid of constantly increasing acidity, and quantities of niter cake having increasing strength in the constituents available for solution in the liquid.

While I have described my invention above in detail, I wish it to be understood that many changes may be made therein without departing from the spirit thereof.

Claims:

1. The process which comprises treating niter cake with water in an amount insufficient to dissolve the niter cake completely, the treatment to be continued until a solution is obtained having an acidity as high as 20 to 30%.

2. The process which comprises treating niter cake with a quantity of water, then applying the resultant liquid to the treatment of another quantity of niter cake, and continuing these treatments until a solution having an acidity as high as 20 to 30% is obtained.

3. The process which comprises treating acid sulfate of sodium with a quantity of water, then applying the resultant liquid to the treatment of another quantity of acid sulfate of sodium, and continuing these treatments until a solution having an acidity as high as 20 to 30% is obtained.

4. The process which comprises treating acid sulfate of sodium with water in an amount insufficient to dissolve the said sulfate completely and continuing the treatment until a solution is obtained having an acidity as high as 20 to 30%.

In testimony that I claim the foregoing I have hereunto set my hand.

WALTER C. HOLMES.

Witnesses:
 A. BARTRAM DUTTON,
 GEO. H. GREGG.